US008483185B2

(12) United States Patent
Hottinen et al.

(10) Patent No.: US 8,483,185 B2
(45) Date of Patent: Jul. 9, 2013

(54) DATA TRANSMISSION METHOD, AND SYSTEM

(75) Inventors: Ari Hottinen, Espoo (FI); Olav Tirkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 1473 days.

(21) Appl. No.: 10/513,511

(22) PCT Filed: May 7, 2003

(86) PCT No.: PCT/FI03/00355
§ 371 (c)(1),
(2), (4) Date: Nov. 5, 2004

(87) PCT Pub. No.: WO03/096573
PCT Pub. Date: Nov. 20, 2003

(65) Prior Publication Data
US 2005/0141494 A1   Jun. 30, 2005

(30) Foreign Application Priority Data
May 8, 2002   (FI) ...................................... 20020880

(51) Int. Cl.
*H04W 4/00*   (2009.01)
*H04B 7/02*   (2006.01)
*H04B 1/00*   (2006.01)
*H04B 1/69*   (2006.01)
*H04M 1/00*   (2006.01)

(52) U.S. Cl.
USPC ............ 370/334; 455/69; 455/24; 455/562.1; 455/63.4; 455/13.3

(58) Field of Classification Search
USPC .................. 375/299, 328; 455/13.3, 24, 63.4, 455/562.1; 370/334, 328
See application file for complete search history.

(56) References Cited

U.S. PATENT DOCUMENTS

| 5,805,996 | A  | * | 9/1998 | Salmela | ......................... 455/453 |
| 6,067,290 | A  | * | 5/2000 | Paulraj et al. | ................. 370/329 |
| 6,317,411 | B1 | * | 11/2001 | Whinnett et al. | ............. 370/204 |
| 6,317,466 | B1 | * | 11/2001 | Foschini et al. | ............... 375/267 |
| 6,373,832 | B1 |   | 4/2002 | Huang et al. | |
| 6,594,473 | B1 | * | 7/2003 | Dabak et al. | .................. 455/101 |

(Continued)

FOREIGN PATENT DOCUMENTS
EP   1 229 669 A1   8/2002
WO   WO 98/25362    6/1998

(Continued)

OTHER PUBLICATIONS

Wong et al, "Orthogonal space-time block coding with antenna selection and power allocation", Electronic Letters, Feb. 2003, vol. 39, Issue 4, pp. 379-381.

(Continued)

*Primary Examiner* — Matthew Sams
(74) *Attorney, Agent, or Firm* — Squire Sanders (US) LLP

(57) ABSTRACT

A data transmission method and system is provided. Symbols to be transmitted are encoded (200) in a first transceiver into at least two data flows using space-time coding. The data flows are transmitted by means of at least three radiation patterns (218 to 224) to a second transceiver (230). The radiation patterns (218 to 224) transmitting the data flows in the first transceiver are varied.

33 Claims, 6 Drawing Sheets

U.S. PATENT DOCUMENTS

Figure 1:
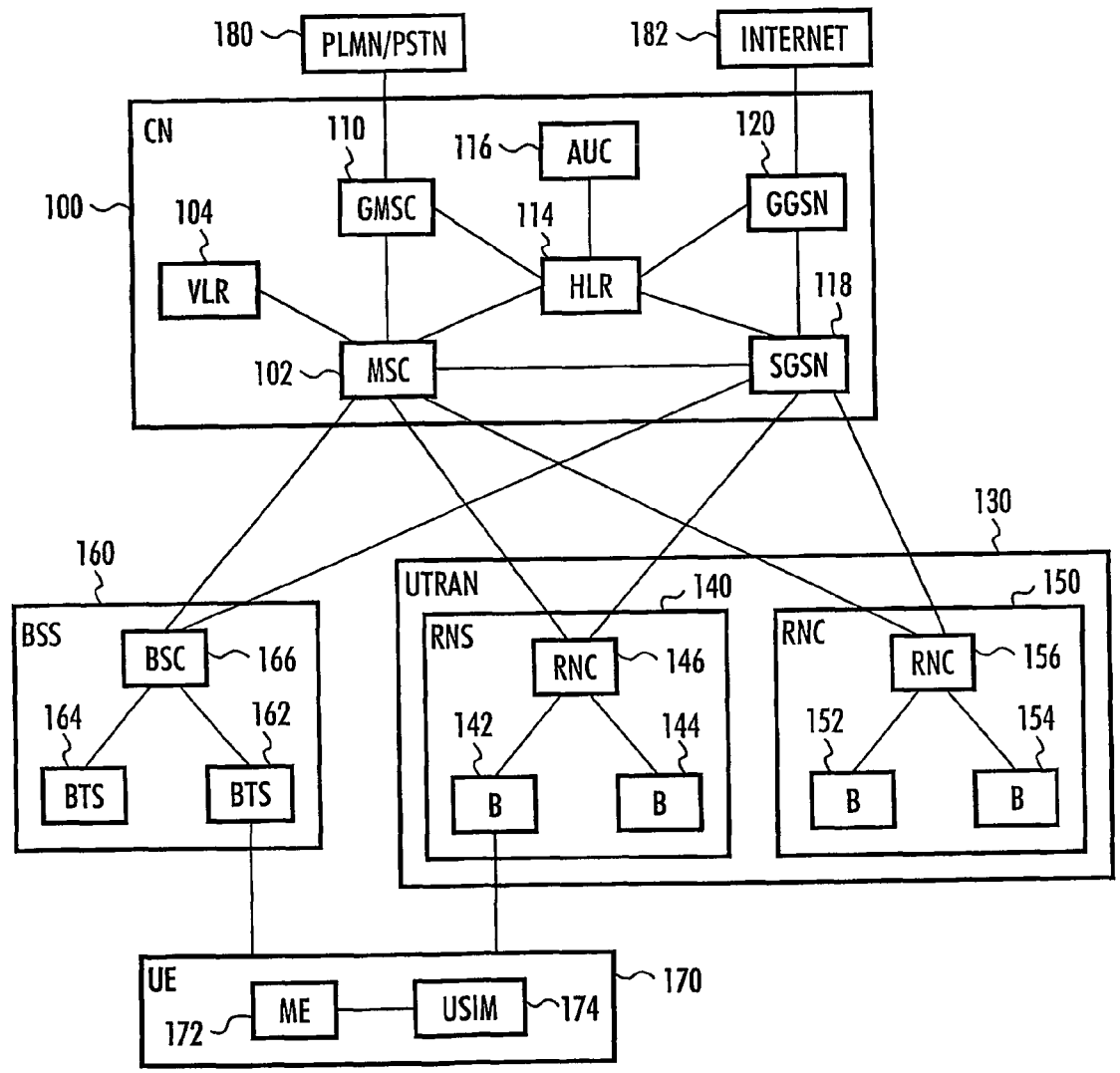

| | | | |
|---|---|---|---|
| 6,917,820 B2 * | 7/2005 | Gore et al. | 455/562.1 |
| 6,985,434 B2 * | 1/2006 | Wu et al. | 370/208 |
| 7,092,737 B2 * | 8/2006 | Horng et al. | 455/562.1 |
| 7,130,663 B2 * | 10/2006 | Guo | 455/562.1 |
| 7,167,690 B2 * | 1/2007 | Baker et al. | 455/101 |
| 2002/0039884 A1 * | 4/2002 | Raynes et al. | 455/13.3 |
| 2002/0155853 A1 * | 10/2002 | Lee et al. | 455/522 |
| 2003/0012171 A1 * | 1/2003 | Schmidl et al. | 370/342 |
| 2004/0204104 A1 * | 10/2004 | Horng et al. | 455/562.1 |

FOREIGN PATENT DOCUMENTS

| | | |
|---|---|---|
| WO | WO 98/25362 A1 | 6/1998 |
| WO | WO 00/51265 | 8/2000 |
| WO | WO 0215432 A1 * | 2/2002 |

OTHER PUBLICATIONS

Tirkkonen et al, "Minimal non-orthogonality rate 1 space-time block code for 3+ Tx antennas", Spread Spectrum Techniques and Applications, 2000 IEEE Sixth International Symposium, Sep. 6-9, 2000, vol. 2, pp. 429-432.

Wong, Wing Hin et al., "Orthogonal Space-Time Block Coding With Antenna Selection and Power Allocation"; Electronics Letters; Feb. 20, 2003; vol. 39, No. 4; pp. 379-381.

Tirkkonen, Olav et al., "Minimal Non-Orthogonality Rate 1 Space-Time Block Code for 3+ Tx Antennas"; IEEE $6^{th}$ Int. Symp. on Spread-Spectrum Tech & Appli., NJIT, New Jersey, USA, Sep. 6-8, 2000; pp. 429-432.

Tarokh, Vahid et al., "Space-Time Block Codes from Orthogonal Designs"; IEEE Transactions on Information Theory, vol. 45, No. 5, Jul. 1999; pp. 1457-1467.

Katz, Marcos et al., "Combining *Space-Time Block Coding with Diversity Antenna Selection for Improved Downlink Performance*", IEEE, Aug. 2001, pp. 178-182.

Chinese Office Action for application No. 03813226.5 issued on Jul. 27, 2007.

Texas Instruments, "*Improved Double-STTD Schemes Using Asymmetric Modulation and Antenna Shuffling*", TSG-Ran Working Group 1 meeting #20, TSGR#20(01)-459, 3GPP, May 5, 2001, pp. 1-12.

Sharma, N. et al., "*Improved Quasi-Orthogonal Codes*", Wireless Communication and Networking Conference, IEEE, Mar. 17, 2002, vol., pp. 169-171.

Japanese Office Action application No. 2004-504417 issued Apr. 4, 2007.

* cited by examiner

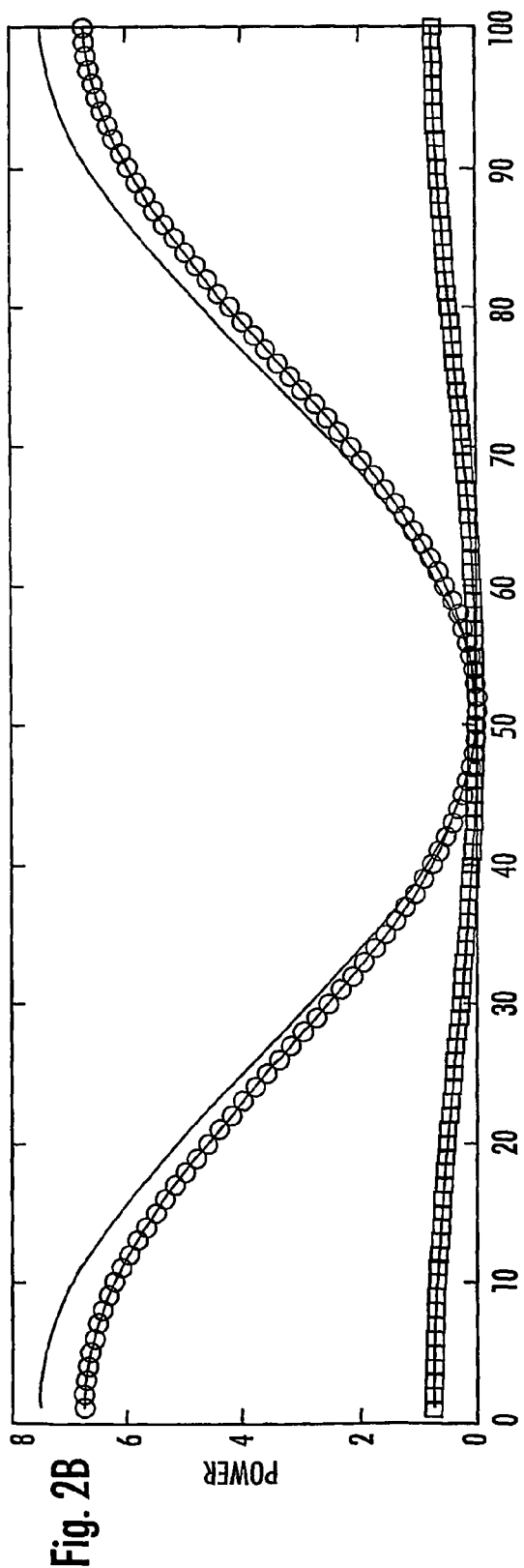
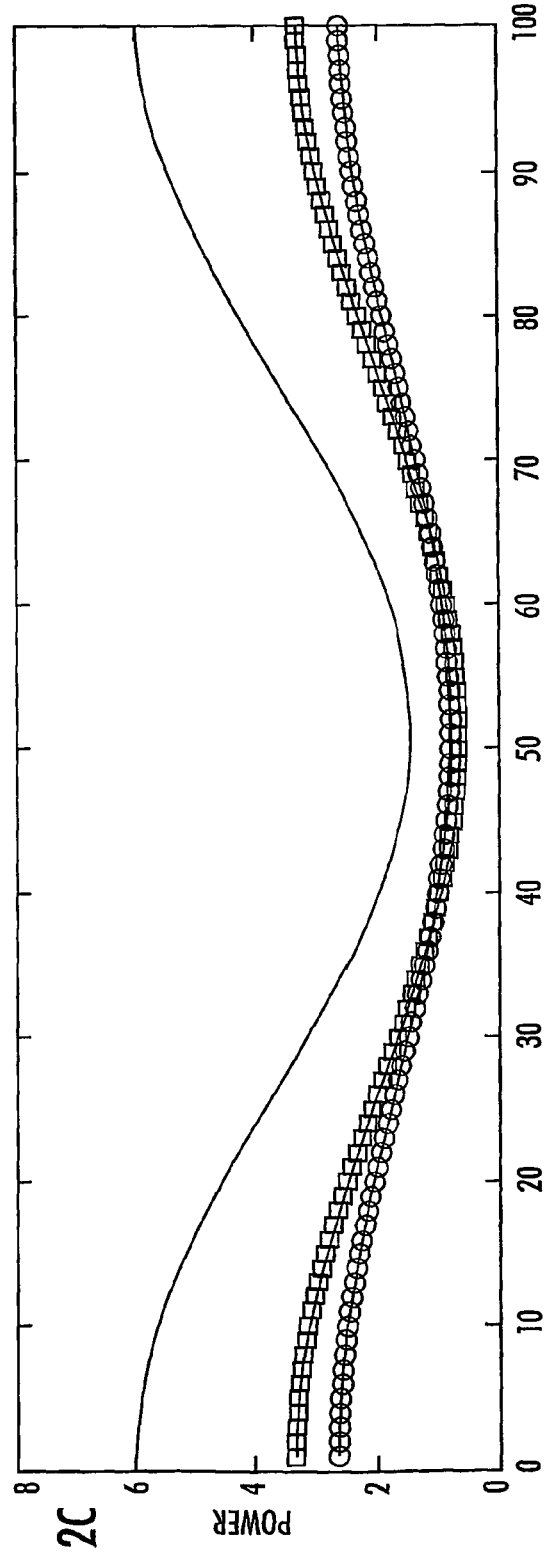
Fig. 2B
Fig. 2C

DATA TRANSMISSION METHOD, AND SYSTEM

FIELD

The invention relates to a data transmission method and system, in which several radiation patterns are used for signal transmission and in which space-time coding is employed.

BACKGROUND

As is known in the art, the transmission path used for transmitting signals over data links causes interference to telecommunications. This occurs irrespective of the physical form of the transmission path, i.e. whether the transmission path is a radio connection, an optical fibre or a copper cable. Especially in radio communications, situations occur, in which the quality of the transmission path varies from one connection to another and also during a connection.

A typical phenomenon is fading occurring on the radio path and causing changes to a transmission channel. Other concurrent connections may also cause interference, which may vary as a function of time and place.

In a typical radio communications environment, signals between a transmitter and a receiver propagate over several paths. Such multipath propagation is mainly caused by a signal being reflected from surrounding surfaces. Signals that have propagated along different paths arrive at the receiver at different times owing to different propagation time delays. Different methods have been developed to compensate for the fading caused by the multipath propagation.

A solution to the problem is to use diversity in the transmitter. Time diversity employs interleaving and encoding to achieve time-based diversity in the signal to be transmitted. However, delays in transmission present a drawback, especially when the channel is slowly fading. In frequency diversity, in turn, the signal is transmitted simultaneously at several frequencies. This is nevertheless an inefficient method, when the channel is provided with a wide coherence bandwidth.

Antenna diversity employs more than one antenna for transmitting and/or receiving a signal. Thus, the signal components that have multipath-propagated through different channels will probably not be interfered with by a simultaneous fade. In reception diversity, two or more antennas having a deviating location are used to receive the transmitted signal. A drawback with the reception diversity is that the use of two antennas is difficult to implement in a terminal, which is to be small. In transmit diversity the same signal is transmitted to a receiver using two or more different antennas. The receiver combines the signals for instance by means of MLSE (maximum likelihood sequence estimator) or MMSE (minimum mean square error) methods. Transmit diversity more applicable to the downlink direction of mobile communication systems than reception diversity, as it is easier to provide a base station with several antennas than a terminal.

Diversity methods may also utilize feedback. What is known as "closed-loop" diversity is then concerned, in which the receiver signals information to the transmitter and in which the general aim is to maximize the signal-to-noise ratio in the receiver. If no feedback is used, then the diversity concerned is referred to as "open loop" diversity.

Cellular radio systems currently under development, such as UMTS, provide the possibility to use two transmit antennas. An example thereof is the UMTS standard version "Release 99". However, the use of even more antennas, for instance four antennas, in transmit diversity is also being developed. Such methods can possibly be employed in subsequent UMTS standard versions. According to Release 99, when transmit diversity is applied, each channel is transmitted with two radiation patterns.

The current UMTS standard employs Space-Time Transmit Diversity (STTD) with encoding ratio 1 applicable to two transmit antennas. The symbols to be transmitted are grouped into blocks, S1 and S2, comprising two symbols. The encoding is determined in its basic mode by a 2×2 matrix:

$$C(S1, S2) = \begin{bmatrix} S1 & S2 \\ -S2^* & S1^* \end{bmatrix} \quad (1)$$

where * denotes a complex conjugate. This matrix extends the encoding over two symbol periods.

If more than two transmit antennas or radiation patterns are to be used, other encoding solutions have to be developed. Publication V. Tahork, H. Jafarkhani, A. R. Calderbank "Space-time block encoding for wireless communications: theory of generalized orthogonal designs" IEEE Trans. Inf. Th., 1999 discloses a solution offering full diversity. The encoding ratio of the presented code is, however, only ¾. In addition, as to the efficiency, the solution is not in balance: the power transmitted from different antennas varies in the different symbol time slots.

Publication O. Tirkkonen, A. Boariu, A. Hottinen: "Minimal orthogonality space-time block code for 3+ Tx antennas", Proc. IEEE Int. Symp. Spr. Spectr. Tech. Appl. (ISSSTA), New Jersey, USA, September 2000 discloses a solution applicable to three or four antennas or radiation pattern further developed based on the matrix (1). The encoding is determined by the following matrix:

$$C(S1, S2, S3, S4) = \begin{bmatrix} C(S1, S2) & C(S3, S4) \\ C(S3, S4) & C(S1, S2) \end{bmatrix} \quad (2)$$

The prior art solutions are, however, not able to provide a fully satisfactory final result when more than two radiation patterns are used or if the transmitter is provided with partial information about the transmission path parameters.

BRIEF DESCRIPTION

It is an object of the invention to provide a method and an apparatus implementing the method so that the use of more than two radiation patterns provide a high-class performance, and particularly when the transmitter is provided with partial information about the transmission path channel. This is achieved with a data transmission method comprising: encoding symbols to be transmitted in a first transceiver into at least two data flows using space-time coding, transmitting the data flows from the first transceiver by means of at least three radiation patterns to a second transceiver, estimating channel parameters of the signals transmitted using the different radiation patterns in the second transceiver, transmitting information associated with the estimation from the second transceiver to the first transceiver. The method according to the invention comprises varying the radiation patterns transmitting the data flows in the first transceiver based on the information received.

The invention also relates to a data transmission method comprising: encoding symbols to be transmitted in a first transceiver into at least two data flows using space-time coding, transmitting the data flows from the first transceiver by means of at least three radiation patterns to a second transceiver. The method comprises varying the radiation patterns used for transmitting the data flows in the first transceiver.

The invention further relates to a data transmission system comprising means for encoding symbols to be transmitted in a first transceiver into at least two data flows using space-time coding, means for transmitting the data flows from the first transceiver by means of at least three radiation patterns to a second transceiver, means for estimating in the second transceiver channel parameters of the signals transmitted using the different radiation patterns, means for transmitting in the second transceiver information associated with the estimation to the first transceiver. Such an arrangement also comprises means for directing the data flows to be transmitted in the first transceiver to the different radiation patterns based on the information received.

The invention also relates to a data transmission system comprising means for encoding symbols to be transmitted in a first transceiver into at least two data flows using space-time coding, means for transmitting the data flows from the first transceiver by means of at least three radiation patterns to a second transceiver. The arrangement also comprises means in the first transceiver for varying the radiation patterns transmitting the data flows.

Preferred embodiments of the invention are disclosed in the independent claims.

In the first transceiver, the symbols to be transmitted are encoded into at least two data flows, which are transmitted to the second transceiver using at least three radiation patterns. The presented solution preferably allows making a decision upon through which radiation pattern and by means of which transmission power each data flow should be transmitted. The data flows to be transmitted in the first transceiver can be directed to different radiation patterns, for instance so that the variance of the received signal is minimized and the required transmission power is at the same time reduced.

In a second embodiment, the radiation pattern used for transmitting a data flow is changed and possibly the transmission power based on the parameters transmitted by the second transceiver. The second transceiver is able to measure the channel parameters of the signals transmitted using the different radiation patterns and either to signal information about the channel parameters to the first transceiver determining the control of the radiation patterns or to calculate the control terms and signal the control information to the first transceiver.

In another embodiment, the radiation pattern used for transmitting the data flow is changed between predetermined alternatives without the control arriving from the receiver. Thus, the choice is made for example randomly or in a predetermined temporarily changing manner. The first transceiver may also measure the signal arriving from the second transceiver and adjust the radiation pattern based on such a measurement. In general, the signal parts are transmitted using different radiation patterns, either in parallel or sequentially. During parallel transmission, the radiation patterns may be fixed, but in such a manner that at least some of the symbols to be transmitted are transmitted using different radiation patterns.

In an embodiment, the properties of radiation patterns used are adjusted in the first transceiver, for instance signal strength in each radiation pattern. This can be carried out for example based on the parameters transmitted in the second transceiver. The radiation pattern received with a good signal-to-noise ratio in the second transceiver is transmitted in the first transceiver with at least as great a power as the radiation pattern received in the second transceiver with a poorer signal-to-noise ratio.

Preferred embodiments can be utilized when different space-time coding methods are used, such as STTD coding according to formula (1) shown above, and coding according to formula (1), to which phase hopping of different STTD branches has been added. Another example of coding is the combination of STTD and orthogonal transmit diversity (OTD).

LIST OF DRAWINGS

Figure 2A:
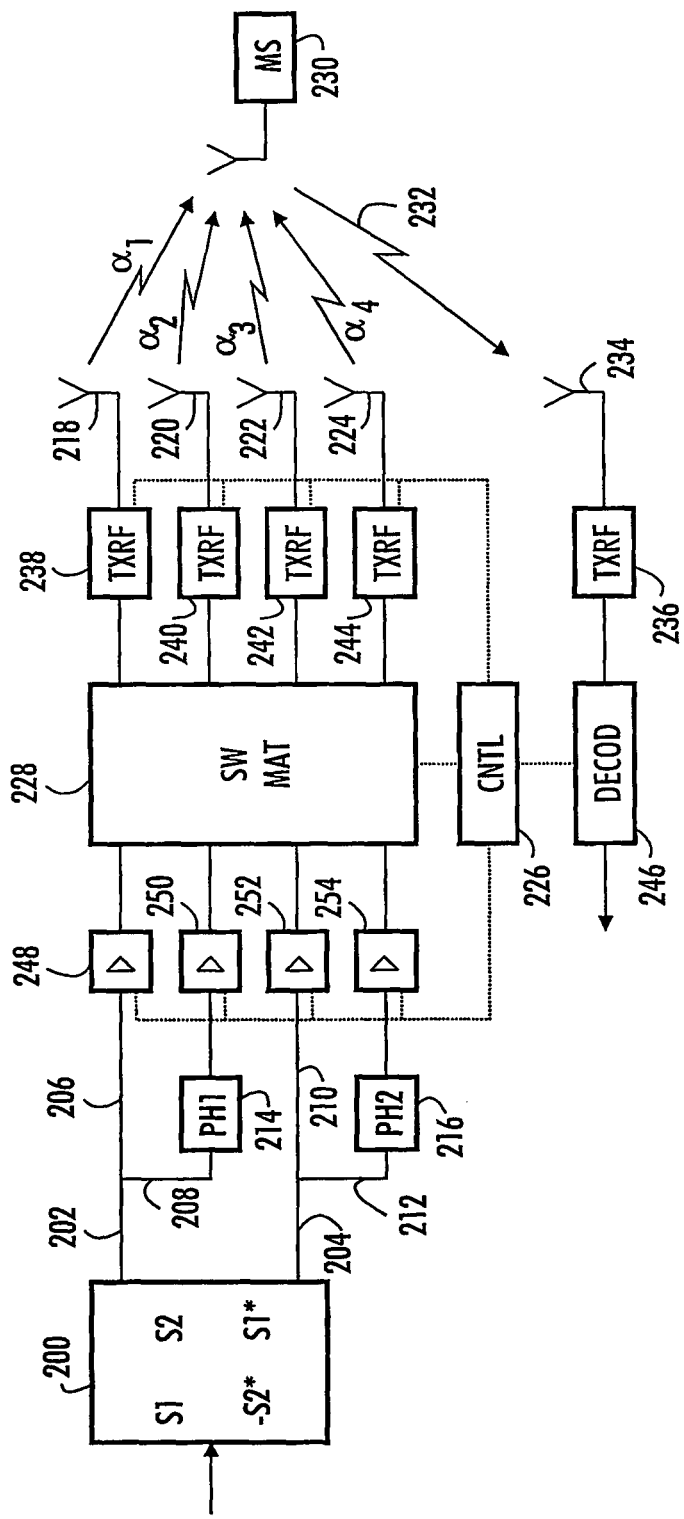
Figure 3:
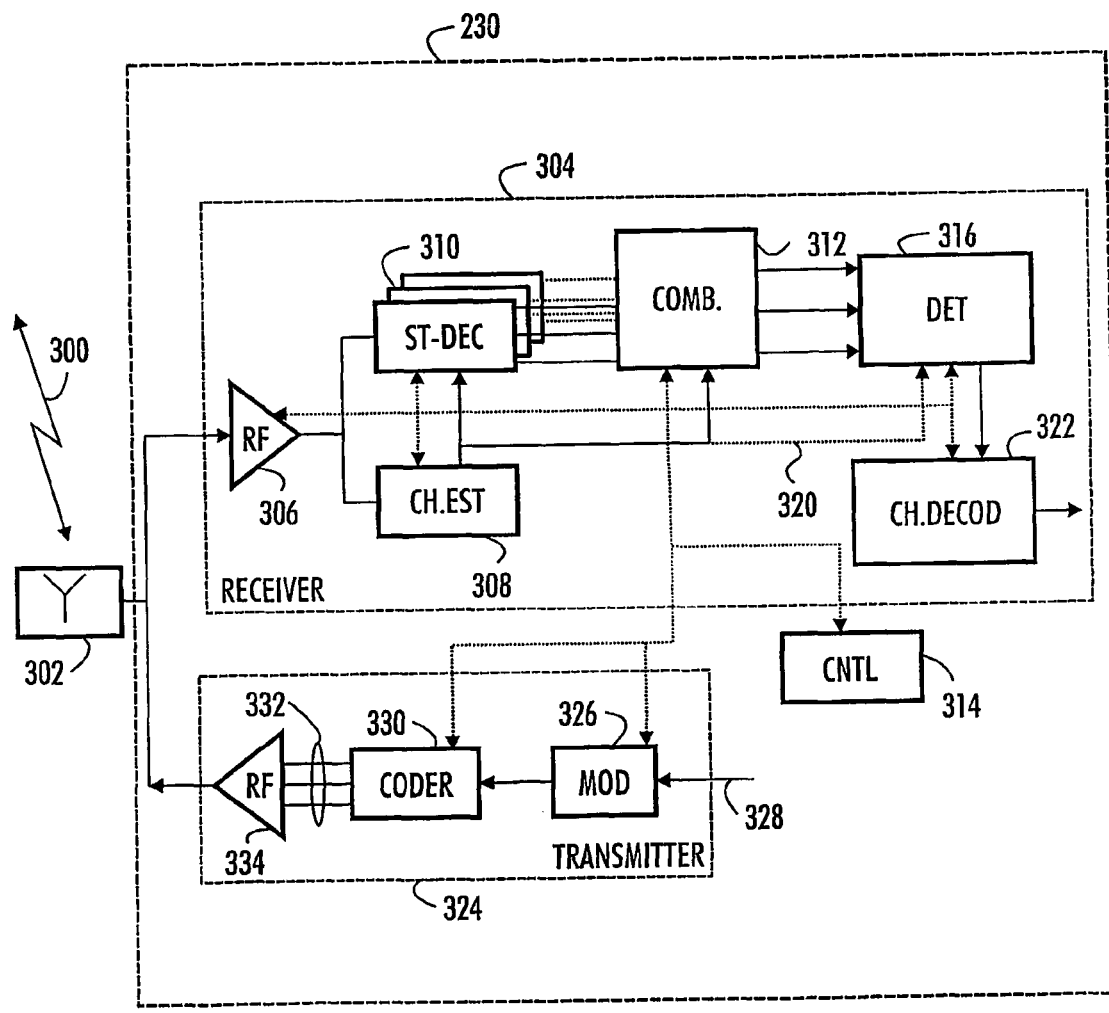
Figure 4A:
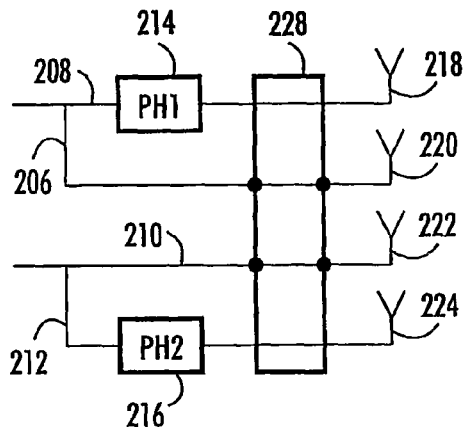
Figure 4B:
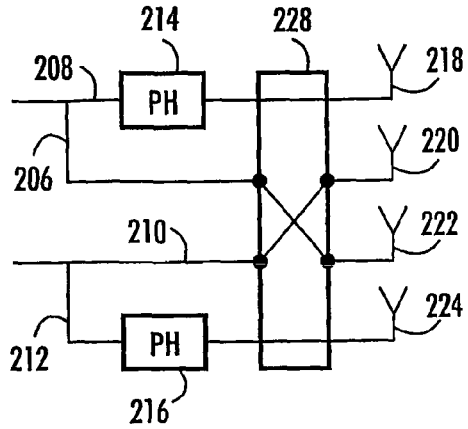
Figure 5A:
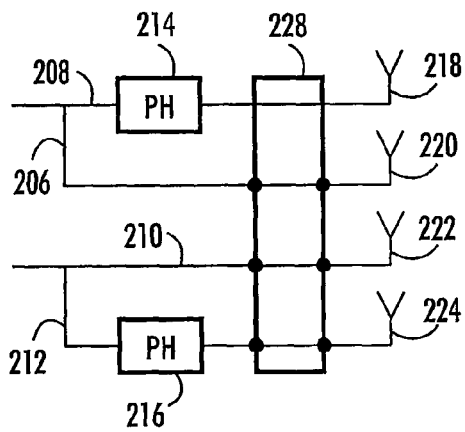
Figure 5B:
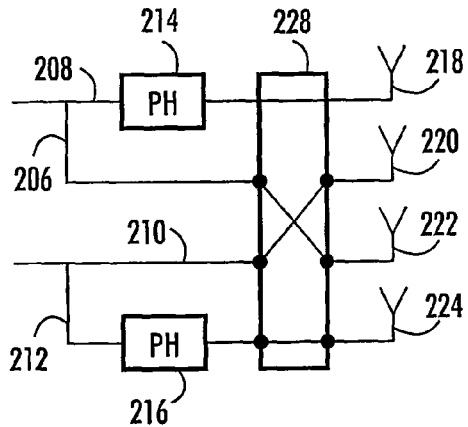
Figure 5C:
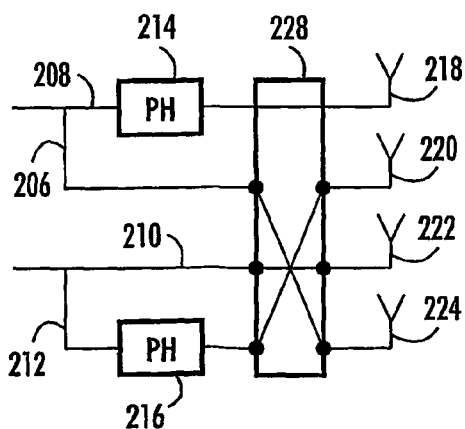
Figure 6:
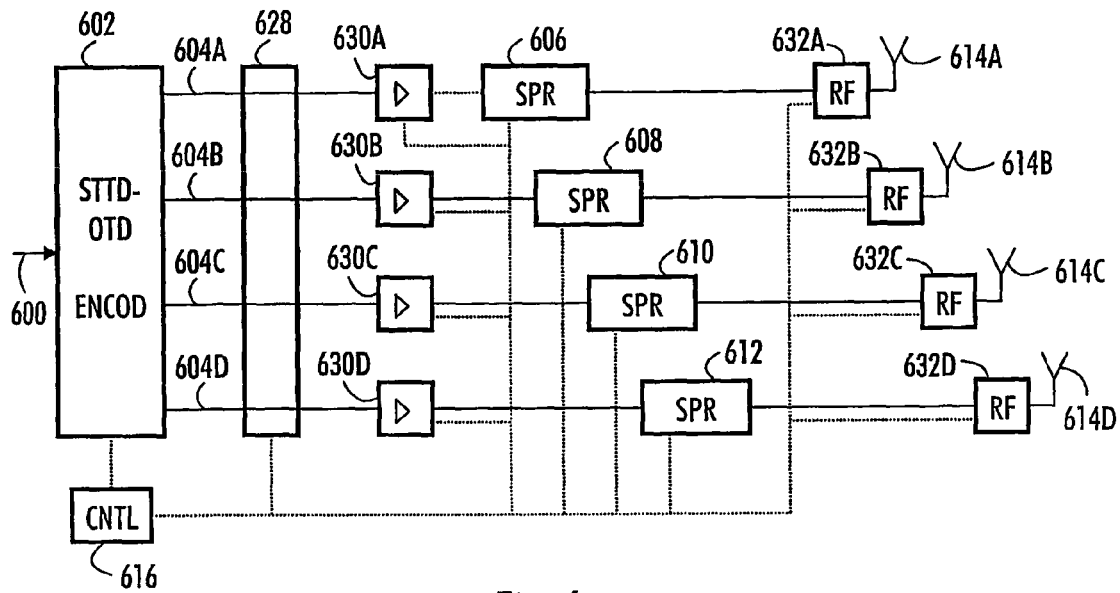
Figure 7:
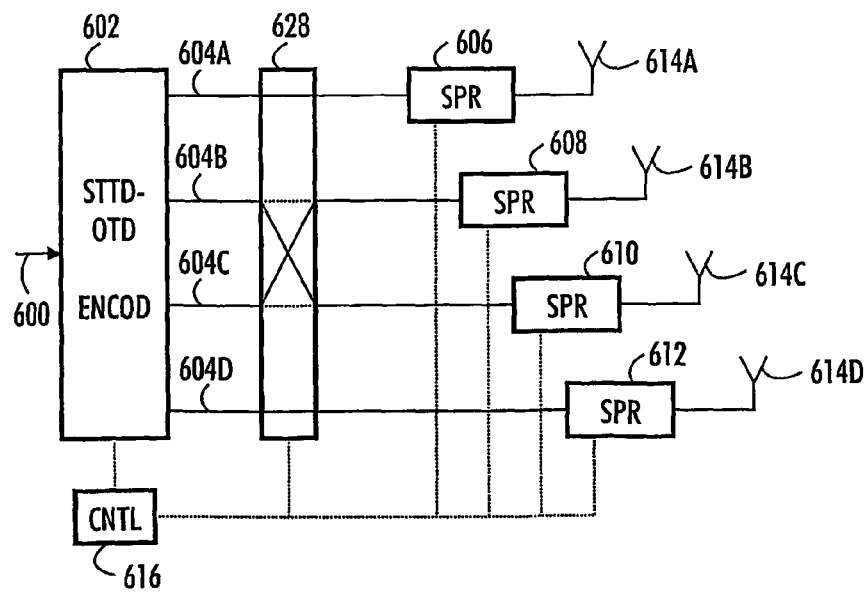

In the following, the invention will be explained in greater detail by means of the preferred embodiments with reference to the accompanying drawings, in which FIG. 1 is a simplified block diagram showing the structure of a radio system, FIGS. 2A to 2C and 3 illustrate a solution, FIGS. 4A to 4B illustrate in more detail an example on how a switching matrix operates, FIGS. 5A to 5C illustrate in more detail a second example on how the switching matrix operates, FIG. 6 illustrates a second solution, and FIG. 7 illustrates in more detail the second solution.

DESCRIPTION OF PREFERRED EMBODIMENTS

The preferred embodiments of the invention are preferably applicable in systems, where symbols to be transmitted in signal transmission are encoded into at least two data flows, which can be transmitted using more than two radiation patterns. An example of such a system is UMTS (Universal Mobile Telecommunication System) as well as other broadband systems. Below the preferred embodiments are described using the UMTS system as an example, without being restricted thereto, as is apparent for those skilled in the art.

Let us clarify some of the terminology used in the application. What a radio system refers to herein is a Radio Access Technology (RAT) of telecommunication systems, which is a part of what is known as an Access Stratum (AS), above which the telecommunication systems comprise a Non Access Stratum (NAS), which employs the services of separate radio systems.

Let us take a closer look at FIG. 1, which illustrates the structure of radio systems. FIG. 1 is a simplified block diagram describing the most important radio system parts at network element level and the interfaces between them. The structure and operation of the network elements are not described in detail, since they are commonly known.

In FIG. 1, a core network CN 100 describes the radio access technology in a telecommunication system. A first radio system i.e. a radio access network 130 and a second radio system i.e. a base station system BSS 160 describe the radio systems. In addition, the Figure shows user equipment UE 170. The term UTRAN refers to the UMTS Terrestrial Radio Access Network, meaning that the radio access network 130 is implemented using Wideband Code Multiple Access WCDMA. The base station system 160 is implemented using Time Division Multiple Access TDMA.

In general, such a definition may also be presented that the radio system is formed of a subscriber terminal known for instance also by such terms as user equipment and mobile station, and a network part including a fixed infrastructure of the radio system such as a radio access network or a base station system.

The structure of the core network 100 corresponds with the structure of the combined GSM and GPRS systems. GSM network elements are responsible for implementing circuit-switched connections, and GPRS network elements for implementing packet-switched connections, although some of the network elements are included in both systems.

A Mobile Services Switching Centre MSC 102 is the centre of the circuit-switched side of the core network 100. The same mobile services switching centre 102 can be used to serve the connections of both the radio access network 130 and the base station system 160. The functions of the mobile services switching centre 102 include: switching, paging, location registration of user equipment, handover management, collecting subscriber billing information, encryption parameter management, frequency allocation management and echo cancellation. The number of mobile services switching centre 102 may vary: a small network operator may be provided with a single mobile services switching centre 102, but larger core networks 100 may be provided with several.

Larger core networks 100 may comprise a separate Gateway Mobile Services Switching Centre GMSC 110 handling the circuit-switched connections between the core network 100 and external networks 180. The gateway mobile services switching centre 110 is located between the mobile services switching centres 102 and external networks 180. The external network 180 may for instance be a Public Land Mobile Network PLMN or a Public Switched Telephone Network PSTN.

A Home Location Register HLR 114 includes a fixed subscriber register, or for instance the following information: an International Mobile Subscriber Identity, IMSI, a Mobile Subscriber ISDN Number, MSISDN, an Authentication Key and a PDP address (PDP=Packet Data Protocol) when the radio system supports the GPRS.

A Visitor Location Register VLR 104 includes information concerning roaming on the user equipment 170 within the area of the mobile services switching centre 102. The visitor location register 104 includes largely the same information as the home location register 114, but in the visitor location register 104, the information is placed only temporarily.

An Authentication Centre AuC 116 is physically always located at the same location as the home location register 114, and includes an Individual Subscriber Authentication Key Ki, Ciphering Key CK and a corresponding IMSI.

The network elements to be described in FIG. 1 are operational entities, and the physical implementation thereof may vary. Generally, the mobile services switching centre 102 and the visitor location register 104 form together a single physical apparatus, and the home location register 114 and the authentication centre 116 another physical apparatus.

A Serving GPRS Support Node SGSN 118 is the centre of the packet-switched side of the core network 100. The main task of the serving GPRS support node 118 is to transmit and receive packets with the user equipment 170 supporting packet-switched transmission using the radio access network 130 or the base station system 160. The serving GPRS support node 118 includes subscriber data and location information concerning the user equipment 170.

A Gateway GPRS Support Node GGSN 120 is the corresponding part on the packet-switched side to the gateway MSC 110 on the circuit-switched side, except that the gateway GPRS support node 120 must be able to route the outgoing traffic from the core network 100 to external networks 182, whereas the gateway MSC 110 only routes the incoming traffic. In this example, the Internet represents the external networks 182.

The first radio system i.e. the radio access network 130 is formed of a radio network subsystem RNS 140, 150. Each radio network subsystem 140, 150 is formed of radio network controllers RNC 146, 156 and of nodes B 142, 144, 152, 154. Node B is a fairly abstract concept and often the term used instead is a base station.

The network controller 146 controls nodes B 142, 144 in its domain. In principle, the idea is to place the apparatuses implementing the radio path and the operations associated therewith into nodes B 142, 144 and the control equipment into the radio network controller 146.

The radio network controller 146 handles the following operations: radio resource management of nodes B 142, 144, inter-cell handover, frequency management, or allocation of frequencies to nodes B 142, 144, management of frequency hopping sequences, measurement of time delays in the uplink direction, operation and maintenance, and power control management.

Node B 142, 144 comprises one or more transceivers implementing the WCDMA radio interface, Typically, node B serves one cell, but such a solution is also possible in which node B serves several sectorized cells. The diameter of the cell may vary from a few meters to dozens of kilometers. Node B 142, 144 has the following functions: calculation of timing advance (TA), measurements in the uplink direction, encryption, decryption and frequency hopping.

The second radio system, or base station system, 160 is composed of a Base Station Controller BSC 166 and Base Transceiver Stations BTS 162, 164. The base station controller 166 controls the base transceiver station 162, 164. In principle, the aim is to place the equipment implementing the radio path and the functions associated therewith in the base station 162, 164 and to place the control equipment in the base station controller 166. The base station controller 166 handles substantially the same functions as the radio network controller.

The base transceiver station 162, 164 includes at least one transceiver implementing a carrier, or eight time slots, or eight physical channels. Typically, one base station 162, 164 serves one cell, but such a solution is also possible, in which one base station 162, 164 serves several sectorized cells. The base station 162, 164 is considered to also include a transcoder, which carries out the conversion between the speech-coding modes used in the radio system and the speech-coding mode used in the public switched telephone network. However, in practice the transcoder is typically physically placed in the mobile services switching centre 102. The base transceiver stations 162, 164 is provided with corresponding functions as node B.

The subscriber terminal 170 is composed of two parts: mobile equipment ME 172 and a UMTS Subscriber Identity Module, USIM 174. The subscriber terminal 170 includes at least one transceiver that implements the radio connection to the radio access network 130 or to the base station system 160. The subscriber terminal 170 comprises at least two different subscriber identity modules. In addition, the subscriber terminal 170 comprises an antenna, user equipment and a battery. Many kinds of subscriber terminals 170 currently exist, for instance vehicle-mounted and portable terminals.

The USIM 174 includes information associated with the user, and in particular information associated with information security, for instance a cryptographic algorithm.

Let us next take a closer look at a preferred embodiment. For clarity, it is assumed in this example that the first transceiver is a base station, and the second transceiver is a subscriber terminal. It is assumed herein that the signal to be transmitted is encoded in accordance with formula (1) in the base station. Two data flows are thus achieved. Each data flow is divided into two and one half of each data flow is multiplied by phase terms $e^{\theta_1}$ and $e^{\theta_2}$, where $\{\theta_1\}$ and $\{\theta_2\}$ are the phase hopping frequencies. FIG. 2A illustrates encoding. An encoder 200 encodes the signal to be transmitted in accordance with formula (1) and the encoder output is provided with two data flows 202 comprising symbols S1 and S2 and 204 comprising symbols −S2* and S1*. These data flows are divided into two branches, in other words the data flow 202 is divided into branches 206 and 208 and the data flow 204 is divided into branches 210 and 212. The data flows 206 and 210 are forwarded as such, but the data flow 208 is applied to a phase shift means 214, in which phase shift $e^{\theta_1}$ is caused thereto. Correspondingly, the data flow 212 is applied to a phase shift means 216, in which phase shift $e^{\theta_2}$ is caused thereto. The phase shift may be either different for each data flow or for the branches 206, 208, 210, 212 or similar for all of them. In this example, the phase shift is different in two branches.

The data flows 206 to 212 are applied to radio frequency units 238 to 244 and transmitted by means of radiation patterns 218 to 224. The radiation patterns may be achieved using four different antennas, or using one or more antenna groups, as is apparent for those skilled in the art. It is not relevant herein how the radiation patterns are formed. The channels or channel coefficients of the radiation patterns 218 to 224 are indicated using terms $\alpha_1, \ldots, \alpha_4$. Multiple code spread can still be carried out for each four data flows before transmission via the antennas. Multiple code spread is explained below in connection with the second embodiment.

The Figure also shows a terminal 230 that receives signal transmitted from the base station. The terminal is arranged to estimate channel parameters of signals transmitted using different radiation patterns. The channel parameters can be estimated for instance using identity sequences or what are known as pilot signals. Processing the pilot signals allow estimating the desired channel parameters for each radiation pattern and the pilot signals enable for instance to deduce the channel parameters of the linear combinations in the radiation patterns of the pilot channels. Alternatively, parameters can be blindly (without known data) estimated utilizing the structure of the signal, such as the spreading code to be used, channel code, modulation or space-time code. The channel parameters concerned include signal-to-noise ratio, strength or impulse response. Estimation can be carried out in known ways. Averaging or filtering the measurement results can be carried out in the terminal over a given or desired time. The time may for instance be longer than the coherence time of the channel or when a frame-mode transmission is concerned as long as several frames.

The terminal may transmit 232 based on the measurements feedback information to the base station. The base station is arranged to receive terminal signal by means of an antenna 234 and a radio frequency unit 236. The base station decodes the received signal in a decoder 246, and the signal is applied to the other parts of the base station. In the Figure, the structure of the base station is shown schematically for the sake of clarity. In practice, the structure of the base station to be implemented may deviate from the one shown in the Figure, as is apparent for those skilled in the art. For example, a base station may transmit and receive using the same antennas.

In a preferred embodiment, each data flow is directed to different radiation patterns in the base station. The receiver notices the linear combination of the channels. The effective channels for two consecutive symbols (for instance at the input of an STTD decoder) are in the following form $$\tilde{\alpha}_{1,t} = \alpha_1 e^{j\theta_{1,t}} \alpha_2 \quad (3)$$

$$\tilde{\alpha}_{2,t} = \alpha_3 + e^{j\theta_{2,t}} \alpha_4. \quad (4)$$

If the phase term revolves 360 degrees during the N space-time encoded block or goes through the given amount of discrete phase states during the block and if the channels change only slightly during the N space-time code, then $$P = 1/N \sum_t |\tilde{\alpha}_{1,t}|^2 + |\tilde{\alpha}_{2,t}|^2 \quad (5)$$

is obtained for all permutations $\alpha \leftarrow P\alpha$, where P denotes a permutation matrix comprising the possible combinations of each data flow and radiation pattern. However, the variance of the term $\{|\tilde{\alpha}_{1,t}|^2 + |\tilde{\alpha}_{2,t}|^2\}$ is generally different for different permutation matrices. This is illustrated in the example shown in FIGS. 2B and 2C, where the powers received from both antenna pairs 1 and 2 are received and as the topmost curve the sum thereof, when different indexing is used. As the Figures show, different indexings are provided with different curves. The indexing shown in FIG. 2C the topmost curve (the sum of powers) varies less, meaning that the variance is smaller. When the channel is constant, the variance directly depends on the relative powers of the different channels $\alpha_1, \ldots, \alpha_4$ and on the indexing employed.

What affects the fact in the preferred solution, through which radiation pattern each data flow is transmitted, is how the channel provided by each radiation pattern is observed in the receiver and how fast or reliable the channel information used is. If the channel information is perfect, it is known that the transmitter should transmit only one data flow to a beam determined by complex coefficients so that a temporary reception power is maximized for each symbol. Signalling perfect channel information to the transmitters or the estimation thereof in the transmitter is typically extremely difficult, and therefore a hybrid solution is reached that includes features of the adjustment of both an open and a closed loop. If it is assumed, for instance, that the radiation patterns can only be changed using a time slot that is longer than the coherence time of the channel, then the radiation patterns should be defined according to another principle so that the selected radiation pattern, or radiation patterns, are averagely the best ones and also so that the radiation patterns are optimized taking into account the space-time coding method used in the transmitter. For example, what the STTD and phase-hopping combination should preferably aim at is to minimize the variance mentioned above within the encoding block provided, in other words to select the indexing and the possible power allocation so that, for instance, the orthogonal parts of the STTD code are transmitted to the most powerful channels in the above encoding method $$|\tilde{\alpha}_{1,t}|^2 \approx |\tilde{\alpha}_{2,t}|^2. \quad (6)$$

This means that it is not preferable to use two channels provided with a good signal-to-noise ratio on average for transmitting the same STTD branch, but they should be used to transmit different branches. It is apparent that also the phases of the channels affect the variance in the above encoding, since this affects the initial stage of the periodic channels in FIGS. 2B and 2C. It is therefore natural that the phase can be controlled in the method in each transmit antenna separately so that the variance is minimized. Let us assume hereafter for the sake of clarity that no phase control is used. Using the above indications the flows 206 and 208 are preferably directed to the radiation patterns in such a manner that the channels in the Figures are not the two best channels. The two best channels should therefore be divided so that one of them transmits either the flow 206 or 208 and the other one transmits the flow 210 and 212. In other words, the phase-shifted data flow or the non-phase-shifted data flow is directed in the second transceiver to the radiation pattern providing the best or second best strength, and the remaining data flow is directed to another radiation pattern than the one providing the best or second best strength in the second transceiver. If the powers of the channel are not known, fixed radiation patterns can be used for transmission or the radiation patterns can be randomized so that the indexing of the radiation patterns changes pseudo randomly at different moments of time.

The example shown in FIG. 2A comprises control means 226, which are typically implemented by a processor and appropriate software, or alternatively by means of a circuit implemented using separate logic circuits or ASIC technology. The control means 226 control a switching matrix 228 that connects the different data flows to be transmitted using different radiation patterns. The control means may function on the basis of the feedback information arriving from the terminal. The terminal may indicate for instance the signal-to-noise ratio of each radiation pattern, or the order of superiority of the radiation patterns, or in the simplest form directly the control of the switching matrix. The base station receives the signal from the terminal and decodes it in a decoder 246, from where the control information can be applied to the control means 226.

In an alternative embodiment, indexing the radiation pattern is based on either the parameters transmitted from the second transceiver, control or measurements carried out in the opposite transmission direction or a combination thereof. The first transceiver may measure the signal of a second transceiver using the radio frequency parts 236, decoder 246 and control means 226 and use the information obtained from the measurements for indexing the radiation patterns. The first transceiver may for instance estimate the received powers for each radiation pattern used in transmission (which may either be the same or different than the radiation patterns used in reception). The measurements may be the channel parameters mentioned above or magnitudes formed thereof, such as channel correlation matrices.

In an alternative embodiment, the first transceiver signals to the second transceiver the radiation patterns used and the possible change or hopping sequence thereof. The second transceiver may also estimate the radiation patterns used from the received signal using known estimation methods. Such information can be used as help in the second transceiver, for example when generating the control parameters of the first transceiver.

Let us take a closer look at an example showing the second transceiver, for instance the terminal shown in FIG. 3. The terminal receives a transmitted signal 300 using three or more antennas. The signal is received using an antenna part 302 of the terminal and is applied to radio frequency parts 306 of a receiver side 304. In the radio frequency parts, the signal is converted to intermediate frequency or baseband. The converted signal is applied to a channel estimator 308, in which estimates are generated for the channel, through which the signal has traveled. What can be estimated in the channel estimator are channel parameters of the signals transmitted using different radiation patterns. Examples of the channel parameters concerned are signal-to-noise ratio and strength.

The measurement results may also be averaged over a given time. The signal is applied from the radio frequency parts also to a decoder bank 310 comprising a number of decoder units that decode the encoding carried out in the transmitter. Since the signal transmitted over the radio path has often propagated along more than one path between the transmitter and the receiver, the received signal comprises several mutlipath components. Each decoder unit processes one received signal component. In the decoder units, the channel estimates allow forming the estimates into original symbols. The symbols decoded in the decoder units are applied to a combiner 312, in which the signals of the different paths are combined. The combiner can be implemented using for instance Rake technique, in which the maximum ratio combination technique is employed. The information about the estimated channel is applied from the channel estimator 308 to the decoder units and to the combiner. The receiver also comprises control means 314 that control the operation of the different parts in the receiver.

From the combiner 312, the signal is applied to a detector 316. Symbol detection can be carried out in the detector by means of known detection methods. The Euclidean distance of the combined symbol estimates can for instance be calculated from possible symbol states or the a posteriori likelihoods of the received symbols or bits can be determined. In the latter case, information on the channel is required, and said information 320 is obtained from the channel estimator 308. From the detector 316, the signal is applied to a channel decoder 322 and further to other parts of the receiver.

A transmitter part 324 of the second transceiver comprises a modulator 326, to which a signal 328 to be transmitted arrives as input. In the modulator, the bits are modulated into symbols. The symbols are applied to a coder 330. The encoded symbols 332 are applied through radio frequency parts 334 to be transmitted by the antenna part 302. The encoder can be implemented preferably by a processor and appropriate software or alternatively using separate components.

The second transceiver may transmit the estimated channel parameters controlled by the control means 314 through a transmission part 324 to the first transceiver. The transmission may occur for instance using signalling channels. The control means 314 may also on the basis of the estimated channel parameters determine control commands, which are transmitted through the transmission part 324 to the first transceiver.

The means that carry out the measures according to the preferred embodiments can be implemented both on the transmitter and receiver sides by a processor and appropriate software or by means of separate components, circuits or ASIC.

Let us next take a closer look at the solution shown in FIGS. 2A and 3 with reference to FIGS. 4A to 4B. An example is illustrated in the Figures, in which the data flow 208 is fixedly connected to the radiation pattern 218 and the data flow 212 is fixedly connected to the radiation pattern 224. Both the data flow 206 and the data flow 210 can be connected either to the radiation pattern 220 or 222. The channels of the radiation patterns 218 to 224 are here indicated with terms $\alpha_1, \ldots, \alpha_4$.

If the two best channels regarding the signal-to-noise ratio are $\alpha_1$ and $\alpha_3$, then the configuration shown in FIG. 4A is selected, in which the data flow 206 is directed to the radiation pattern 220 and the data flow 210 to the radiation pattern 222.

If in turn, the two best channels regarding the signal-to-noise ratio are $\alpha_1$ and $\alpha_2$, then the configuration shown in FIG. 4B is selected, in which the data flow 206 is directed to the radiation pattern 222 and the data flow 210 to the radiation pattern 220.

If the two best channels regarding the signal-to-noise ratio are $\alpha_1$ and $\alpha_4$ or $\alpha_2$ and $\alpha_3$, then all channels can be provided with certain data flows. For example, if it is desired that the channels of the best and third best quality are provided with the data flows of the same STUD branch, or that the channels of the best and poorest quality are provided with the data flows of the same STTD branch. Otherwise, only the data flows of the two best channels can be arranged.

In the simplest alternative, the implementations shown in FIGS. 4A and 4B require only one bit for the feedback channel, since the switching matrix 228 is provided with only two possible positions, either the position shown in FIG. 4A or in FIG. 4B.

FIGS. 5A to 5C illustrate another example. In this example, the data flow 208 is fixedly connected to the radiation pattern 218 and the other data flows can be connected to any radiation pattern by means of the switching matrix 228. In the configuration shown in FIG. 5A, the data flow 206 is directed to the radiation pattern 220, the data flow 210 to the radiation pattern 222 and the data flow 212 to the radiation pattern 224. In the configuration shown in FIG. 5B, the data flow 206 is directed to the radiation pattern 222, the data flow 210 to the radiation pattern 220 and the data flow 212 to the radiation pattern 224. In the configuration shown in FIG. 5C, the data flow 206 is directed to the radiation pattern 224, the data flow 210 to the radiation pattern 222 and the data flow 212 to the radiation pattern 220.

In addition to the above-described examples, other solutions may naturally also be implemented, in which the data flows and radiation patterns are connected differently. In the above-described examples, the data flow 208 is fixedly connected to be transmitted using the radiation pattern 218, and the other data flows can be transmitted varyingly through the different radiation patterns. This is only one implementation example. It is also possible to implement a solution, in which all combinations are possible.

The preferred embodiments can also be utilized when other encoding methods than the above encoding according to formula (1) are used together with phase hopping. Let us next take a closer look at the combination of STTD and orthogonal transmit diversity OTD as an example thereof that allows providing for instance four data flows, which can be directed to different radiation patterns. FIG. 6 illustrates STTD and OTD encoding. A data flow to be transmitted 600 is applied to an encoder 602, in which encoding in accordance with formula (1) is carried out:

$$[x_1 \ x_2 \ x_3 \ x_4] \to \begin{matrix} TxA1: \\ TxA2: \\ TxA3: \\ TxA4: \end{matrix} \begin{bmatrix} x_1 & x_1 & x_2 & x_2 \\ -x_2^* & -x_2^* & x_1^* & x_1^* \\ x_3 & -x_3 & x_4 & -x_4 \\ -x_4^* & x_4^* & x_3^* & -x_3^* \end{bmatrix} \times \frac{1}{2}, \quad (7)$$

where ½ is the normalization coefficient of the transmission power. Each horizontal line in the matrix represents a signal to be transmitted with one radiation pattern. Multiple code spread can be carried out for each one of the four data flows 604A to 604D in multipliers 606 to 612, where the same spreading codes are used for each data flow. In multiple code spread the signal (at least two space-time matrices, for instance) is transmitted using parallel spreading codes, ODFM carriers, a multi-carrier method or any parallel modulation method. It should be observed that the signal to be transmitted through all radiation patterns is orthogonal, in other words the lines in the matrix (7) are orthogonal. The signals obtained in this way are applied to radio frequency units 632A to 623D and transmitted through the radiation patterns 614A to 614D. The transmitter also comprises control means 616, which are typically implemented by a processor and appropriate software, or alternatively using a circuit implemented using separate logic circuits or ASIC technology. The control means 616 control the switching matrix 628, which connects the different data flows to be transmitted with different radiation patterns at different moments of time or to different parallel data flows in multiple code or parallel transmission.

In the receiver, the signal received by a number of antennas is despread and connected coherently using a simple block decoding rule based on the orthogonality of formula (7).

FIG. 7 illustrates a simple example on how the switching matrix 628 operates. At a particular moment in time, the data flow 604B is directed to the radiation pattern 614C instead of the radiation pattern 614B, and correspondingly the data flow 604C is directed to the radiation pattern 614B instead of the radiation pattern 614C. At other moments of time, the data flows are directed as shown in FIG. 6. The radiation patterns can be alternately used, for instance.

Generally, the problem in STTD-OTD transmission is a stationary channel, whereby the combined powers are in the following form:

$$|\alpha_1|^2 + |\alpha_2|^2 \quad (8)$$

$$|\alpha_3|^2 + |\alpha_4|^2 \quad (9)$$

When an embodiment representing the variation of the radiation patterns is used, the combined powers obtain four values:

$$|\alpha_1|^2 + |\alpha_2|^2$$

$$|\alpha_3|^2 + |\alpha_4|^2$$

$$|\alpha_1|^2 + |\alpha_3|^2$$

$$|\alpha_2|^2 + |\alpha_4|^2$$

and this allows achieving considerable advantage in the channel decoder when a turbo or convolution coder is used, since in an inferior situation in which the channels are constants above the given block, the channel decoder notices the channel as a currently fading channel with four states, whereas without the variation of the radiation patterns the channel decoder notices the channel as a fading channel with two states. Adding different indexing configurations increases the number of channel states. If the channel coefficients or the average power thereof are known, partly known or estimated, the indexing may be selected in the transmitter so that the powers of the states are as similar as possible. In the above STTD-OTD transmission, the number of possible (non-redundant) indexings is six, and the receiver may signal the desired indexing with three bits.

In general, this embodiment also allows changing the different STTD-OTD radiation patterns among one another. It is therefore possible to change for instance the radiation patterns used for transmitting the data flows 604A and 604C, or 604A and 604D, or 604B and 604C or 604B and 604D with one another. In addition, the method can be implemented in transmission provided with a high symbol rate so that the radiation patterns of blocks provided with different symbol rates 2 change:

Block 1 is transmitted using the following indexing, for example $$[x_1 \ x_2 \ x_3 \ x_4] \rightarrow \begin{array}{l} TxA1: \\ TxA2: \\ TxA3: \\ TxA4: \end{array} \begin{bmatrix} x_1 & x_1 \\ -x_2^* & -x_2^* \\ x_3 & -x_3 \\ -x_4^* & x_4^* \end{bmatrix} \times \frac{1}{2}$$

and block 2 (at different moments of time or simultaneously on a different parallel channel)

$$[x_5 \ x_6 \ x_7 \ x_8] \rightarrow \begin{array}{l} TxA1: \\ TxA2: \\ TxA3: \\ TxA4: \end{array} \begin{bmatrix} x_5 & x_5 \\ -x_6^* & -x_6^* \\ x_7 & -x_7 \\ -x_8^* & x_8^* \end{bmatrix} \times \frac{1}{2}$$

The variation of the radiation pattern used for transmitting each data flow may in some embodiments be based on either the control commands transmitted by the receiver or on the data describing the channel transmitted by the receiver, or the control may be carried out randomly, pseudo randomly or using predetermined variation. In the previous example, a solution was used, in which the radiation pattern was alternately changed. The variation may thus also be random, or be based on the properties of the transmission channel. The control based on feedback is efficient, since such a control can be used to compensate for the properties of the channel, whereas the control carried out without feedback is simple to implement, as it does not require the recipient to signal any information to the transmitter.

In an embodiment, the measurements carried out from the radiation patterns of the first transceiver are averaged in the second transceiver as well as the parameters obtained therefrom for a given time. Consequently, the effect of sudden variations can be eliminated.

Further, in an embodiment, the properties of the radiation patterns used are adjusted in the first transceiver. The properties may include, for instance, the direction and transmission power of the radiation patterns. The adjustment may take place based on the parameters or signalling transmitted by the second transceiver. The adjustment is based either on the parameters transmitted by the second transceiver, control or on measurements performed in the opposite transmission direction or a combination thereof. In an alternative, the adjustment is based on averaged power measurements. The terminal may for instance maintain an averaged correlation matrix based on the measurements carried out from the radiation patterns:

$$R[t_0] = C \sum_{t=t_0-P}^{t_0} H^H[t]H[t] \qquad (10)$$

where H[t] corresponds to the temporary channel matrix in time slot t (indicated with terms α used in the previous example H=[$\alpha_1 \ \alpha_2 \ \alpha_3 \ \alpha_4$]) and C is a normalizing coefficient. P is an integration window, i.e. time over which terms are averaged, and is preferably longer than the coherence time of the channel. Alternatively, the terminal may average the channel matrix also from different frequencies and/or over channel matrices estimated from the different reception antennas.

If integration is carried out from different frequencies, the transmitter should transmit pilots in parallel or sequentially on different frequency bands. On correlating channels, the matrix is provided with a small amount of dominant eigen values. In the terminal known methods are employed to calculate eigen values $\lambda_i$ and corresponding eigen vectors $W_i = [w_{i1}, w_{i2}, w_{i3}, w_{i4}]$ for matrix R, and for which the following holds true $$\sum_{j=1}^{4} |w_{ij}|^2 = 1. \qquad (11)$$

The terminal signals the eigen values or the parameters thereof to the base station. The base station adjusts the radiation patterns, for instance the direction and strength thereof based on the signalling information. One way to handle power control is to employ what is referred to as the water-filling principle. The Singular Value Decomposition (SVD) of the correlation matrix is indicated by R=WΛW, where $W=[W_1 \ W_2 \ W_3 \ W_4]^T$, and $=[\lambda_1 \lambda_2 \lambda_3 \lambda_4]^T$.

Now, power is allocated for the radiation pattern $W_i$ $$(\mu - \lambda_i^{-1})_+, \qquad (12)$$

where μ fulfils the condition $$P(\mu) = \sum_i (\mu - \lambda_i^{-1})_+, \qquad (13)$$

P denotes the available power. From equation (13) μ can be solved, and this solution applied to equation (12) provides the optimal power for the radiation pattern concerned. One example only has been described above to implement power control or power allocation to parallel transmissions. The power allocation can also be implemented in such a manner that different data flows are provided with reception power that is as similar as possible. The radiation patterns to be transmitted can be controlled using different methods, and powers can be allocated thereto in accordance with different principles. When the radiation patterns are fixed and possibly the powers too, the space-time code parts to be used should preferably be indexed to different radiation patterns. When conventional techniques are used, the indexing is fixed. It should also be noted that the preferred embodiments are especially useful, when the space-time code to be used is orthogonal as regards the receiver, but not an orthogonal code provided with full diversity. For example, in STTD-OTD encoding, the lines are orthogonal, but half of the symbols to be transmitted are received with powers (8) and (9), which are in general of different sizes. Likewise, when phase conversion is used, it is noticed that some of the symbols are received with different powers (in formulas (3) and (4) the powers are generally of different sizes). The space-time codes provided with full diversity (where all symbols obtain the same power in the receiver) restrict the symbol rate to be used. The preferred embodiments employ STTD-OTD or STTD-phase hopping transmission or a corresponding transmission of restricted diversity. The invention can also be applied in space-time transmission of high symbol rate, in which the symbol rate is above one. It is assumed in this example that the number of radiation patterns is four.

With reference to FIG. 2A, in this embodiment the first transceiver comprises an amplifier 248 to 254 in each branch 206 to 212. The amplifier adjusts the strength of the branch based on the control provided by the control means 226. The amplifiers may also be placed after the switching matrix 228. Correspondingly, the control means 226 may control RF parts 238 to 244 that allow controlling the direction and form of the radiation patterns. The amplifiers 248 to 254 may also be placed in connection with the RF parts.

Correspondingly, with reference to the description of the second embodiment and to FIG. 6, the transceiver comprises an amplifier 630A to 630D in each branch adjusting the strength of the branch based on the control provided from the control means 616. The amplifiers may also be located before the switching matrix 628. Correspondingly, the control means 616 may control RF parts 632A to 632D that allow controlling the direction and form of the radiation patterns.

Furthermore, in a preferred embodiment of the invention, the length of the radiation pattern sequence is at the most as long as the length of the channel-encoded block. Furthermore, in a preferred embodiment of the invention, N M×M space-time encoded matrices are formed in the encoder of the transmitter, where N is greater than one and M is greater than two, the columns in the matrix refer to symbols to be transmitted on different orthogonal channels and the lines in the matrix include at least two orthogonal symbol sequences and at least one sequence that is identical with a sequence on at least another line. Furthermore, in a preferred embodiment of the invention, a phase shift is performed in the encoder of the transmitter to at least one identical sequence.

Even though the invention has above been described with reference to the example according to the accompanying drawings, it is apparent that the invention is not restricted thereto but can be modified in many ways within the scope of the inventive idea presented in the appended claims.

The invention claimed is:

1. A method, comprising:
    encoding symbols to be transmitted, in a first transceiver, into at least two data flows using space-time coding;
    transmitting the data flows from the first transceiver using at least three radiation patterns to a second transceiver;
    estimating channel parameters of the data flows transmitted using the at least three radiation patterns, in the second transceiver;
    transmitting information associated with the estimation from the second transceiver to the first transceiver; and
    routing differently the data flows resulting in a different physical path of the at least three radiation patterns based on the information received,
    wherein said at least three radiation patterns are each transmitting at least one space-time branch.

2. The method as claimed in claim 1, wherein the estimated channel parameters comprise information on a signal-to-noise ratio.

3. The method as claimed in claim 1, further comprising:
    determining, in the second transceiver, two of the at least three radiation patterns providing the best quality and routing differently the data flows of the space-time coding to the two radiation patterns providing the best quality.

4. The method as claimed in claim 1, wherein the estimated channel parameters are transmitted to the first transceiver.

5. The method as claimed in claim 1, further comprising:
    determining control commands based on the estimated channel parameters;
    transmitting the control commands to the first transceiver; and
    routing differently the data flows to the at least three radiation patterns based on the control commands.

6. The method as claimed in claim 1, wherein multiple code spread is performed before transmission to each data flow to be routed to a different radiation pattern.

7. The method as claimed in claim 1, further comprising:
    adjusting properties of the at least three radiation patterns used in the first transceiver based on the estimated channel parameters transmitted by the second transceiver.

8. The method as claimed in claim 1, further comprising:
    adjusting the properties of the at least three radiation patterns used in the first transceiver.

9. The method as claimed in claim 8, further comprising:
    adjusting the direction and transmission power of the at least three radiation patterns used.

10. The method as claimed in claim 9, wherein the radiation pattern received in the second transceiver with a good signal-to-noise ratio is used to transmit in the first transceiver with at least the same power as the radiation pattern received in the second transceiver with a weaker signal-to-noise ratio.

11. The method as claimed in claim 8, further comprising:
    determining control commands based on the estimated parameters;
    transmitting the control commands to the first transceiver; and
    adjusting the direction and transmission power of the at least three radiation patterns to be used in the first transceiver based on the control commands.

12. The method as claimed in claim 1, further comprising:
    averaging the parameters to be estimated during a given time.

13. The method as claimed in claim 1, further comprising:
    routing differently the data flows to the at least three radiation patterns in such a manner that a variance of the received signal is minimized.

14. The method as claimed in claim 1, wherein the space-time coding is space time transmit diversity—orthogonal transmit diversity encoding.

15. The method as claimed in claim 1, wherein a length of a radiation pattern sequence is at the most as long as the length of a channel-encoded block.

16. The method as claimed in claim 1, wherein the second transceiver transmits a signal to the first transceiver, the first transceiver carries out measurements from the received signal, and employs the measurement information as help when changing the radiation patterns.

17. A method, comprising:
    encoding symbols to be transmitted, in a first transceiver, into at least two data flows using space-time coding;
    transmitting the data flows from the first transceiver using at least three radiation patterns to a second transceiver; and
    routing differently the data flows resulting in a different physical path of the at least three radiation patterns based on channel estimation associated information received from the second transceiver,
    wherein said at least three radiation patterns are each transmitting at least one space-time branch.

18. The method as claimed in claim 17, wherein the at least three radiation patterns are varied randomly between predetermined alternatives.

19. The method as claimed in claim 18, wherein the predetermined radiation patterns depend on the space-time coding used.

20. The method as claimed in claim 17, wherein the at least three radiation patterns are varied in a predetermined manner.

21. A method, comprising:
    encoding symbols to be transmitted, in a first transceiver, into at least two data flows using space-time coding;

transmitting the data flows from the first transceiver using at least three radiation patterns to a second transceiver, wherein said at least three radiation patterns are each transmitting at least one space-time branch;
estimating channel parameters of the data flows transmitted using the at least three radiation patterns, in the second transceiver;
transmitting information associated with the estimation from the second transceiver to the first transceiver;
routing differently the data flows resulting in a different physical path of the at least three radiation patterns based on the information received;
receiving channel-encoded and interleaved symbols to be transmitted to an encoder of a transmitter;
forming, in the encoder of the transmitter, N M×M space-time encoded matrices, wherein N is greater than one and M is greater than two, and wherein the columns in the matrix refer to symbols to be transmitted on different orthogonal channels and the lines in the matrix include at least two orthogonal symbol sequences and at least one sequence that is identical with a sequence on at least another line; and
transmitting at least two matrices using at least two of the at least three radiation patterns.

22. The method as claimed in claim 21, further comprising:
directing a phase-shifted sequence or non-phase-shifted sequence in the second transceiver to the radiation pattern providing the best or second best quality; and
directing a remaining sequence to another radiation pattern than the radiation pattern providing the best or second best quality in the second transceiver.

23. The method of claim 21, further comprising:
performing phase shift in the encoder of the transmitter to at least one identical sequence.

24. A system, comprising:
a first transceiver; and
a second transceiver,
wherein the first transceiver comprises
an encoder configured to encode symbols to be transmitted into at least two data flows using space-time coding,
a transmitter configured to transmit the data flows using at least three radiation patterns to the second transceiver, and
a directing unit configured to route differently the data flows resulting in a different physical path of the at least three radiation patterns based on information received from the second transceiver,
wherein the second transceiver comprises
a receiver configured to receive the data flows from the first transceiver,
an estimator configured to estimate channel parameters of the data flows transmitted using the at least three radiation patterns, and
a transmitter configured to transmit information associated with the estimation to the first transceiver,
wherein said at least three radiation patterns are each transmitted at least one space-time branch.

25. A method, comprising:
encoding symbols to be transmitted, in a first transceiver, into at least two data flows using space-time coding;
transmitting the data flows from the first transceiver using at least three radiation patterns to a second transceiver;
receiving information associated with a channel estimation from the second transceiver, at the first transceiver; and
routing differently the data flows resulting in a different physical path of the at least three radiation patterns based on the information received,
wherein said at least three radiation patterns are each transmitting at least one space-time branch.

26. An apparatus, comprising:
an encoder configured to encode symbols to be transmitted into at least two data flows using space-time coding,
a transmitter configured to transmit the data flows using at least three radiation patterns,
a receiver configured to receive information associated with a channel estimation, and
a directing unit configured to route differently the data flows resulting in a different physical path of the at least three radiation patterns based on the information received,
wherein said at least three radiation patterns are each transmitting at least one space-time branch.

27. The apparatus of claim 26, wherein the directing unit is further configured to route differently the data flows to the at least three radiation patterns based on received control commands.

28. The apparatus of claim 26, wherein the directing unit is further configured to route differently the data flows of the space-time coding to two of the at least three radiation patterns providing the best quality.

29. The apparatus as claimed in claim 26, wherein the directing unit is further configured to route differently the data flows of the space-time coding to two of the at least three radiation patterns providing the best strength in the second transceiver.

30. The apparatus as claimed in claim 26, wherein the encoder is further configured to carry out multiple code spread before transmission to each data flow to be routed to a different radiation pattern.

31. The apparatus as claimed in claim 26, wherein the directing unit is further configured to adjust the direction and transmission power of the at least three radiation patterns used.

32. A computer program embodied on a non-transitory computer readable medium having computer program code that when run on a computer executes a method, the method comprising:
encoding symbols to be transmitted, in a first transceiver, into at least two data flows using space-time coding;
transmitting the data flows from the first transceiver using at least three radiation patterns to a second transceiver;
receiving information associated with an estimation of channel parameters of the data flows transmitted using the at least three radiation patterns from the second transceiver, at the first transceiver; and
routing differently the data flows in the first transceiver resulting in a different physical path of the at least three radiation patterns based on the information received,
wherein said at least three radiation patterns are each transmitting at least one space-time branch.

33. An apparatus, comprising:
an encoder configured to encode symbols to be transmitted into at least two data flows using space-time coding;
a transmitter configured to transmit the data flows using at least three radiation patterns;
a receiver configured to receive information associated with a channel estimation, and
a directing unit configured to route differently the data flows resulting in a different physical path of the at least three radiation patterns based on the information received, wherein said directing unit is further configured to switch two different space-time branches between two of said at least three radiation patterns based on said information received.

* * * * *